(12) United States Patent
Delves et al.

(10) Patent No.: US 7,972,103 B2
(45) Date of Patent: Jul. 5, 2011

(54) APPARATUS FOR TRANSFERRING SETTLED OR SUSPENDED SOLIDS FROM AN OPEN VESSEL INTO A CLOSED VESSEL

(75) Inventors: James Edward Delves, Bristol (GB); David John Parkinson, North Somerset (GB)

(73) Assignee: Cameron International Corporation, Houston, TX (US)

( * ) Notice: Subject to any disclaimer, the term of this patent is extended or adjusted under 35 U.S.C. 154(b) by 902 days.

(21) Appl. No.: 10/535,379

(22) PCT Filed: Nov. 3, 2003

(86) PCT No.: PCT/GB03/04695
§ 371 (c)(1),
(2), (4) Date: Apr. 4, 2006

(87) PCT Pub. No.: WO2004/041690
PCT Pub. Date: May 21, 2004

(65) Prior Publication Data
US 2006/0171786 A1  Aug. 3, 2006

(30) Foreign Application Priority Data
Nov. 5, 2002  (GB) .................................. 0225802.8

(51) Int. Cl.
*B63B 27/25*  (2006.01)
(52) U.S. Cl. ..................... 414/137.5; 175/60; 406/136

(58) Field of Classification Search ............... 175/217, 175/60; 414/137.1, 137.5; 406/25, 33; 44/280–282
See application file for complete search history.

(56) References Cited

U.S. PATENT DOCUMENTS

| 2,010,538 | A | * | 8/1935 | Evans .......................... 210/153 |
| 2,941,783 | A | * | 6/1960 | Stinson ....................... 175/206 |
| 4,707,277 | A | * | 11/1987 | Mims .......................... 210/805 |
| 4,802,964 | A | * | 2/1989 | Muralidhara et al. ......... 204/544 |
| 5,098,667 | A | * | 3/1992 | Young et al. ................. 422/111 |
| 5,796,012 | A | * | 8/1998 | Gomi et al. .............. 73/861.357 |

OTHER PUBLICATIONS

Closed. (n.d.). The American Heritage® Dictionary of the English Language, Fourth Edition. Retrieved Oct. 21, 2009, from Dictionary.com website: http://dictionary.reference.com/browse/closed.*
Vessel. (n.d.). Dictionary.com Unabridged. Retrieved Oct. 21, 2009, from Dictionary.com website: http://dictionary.reference.com/browse/vessel.*

* cited by examiner

*Primary Examiner* — Gregory W Adams
*Assistant Examiner* — Jonathan D Snelting
(74) *Attorney, Agent, or Firm* — Mossman Kumar & Tyler PC

(57) ABSTRACT

Apparatus for transferring settled or suspended solids from an open vessel into a closed vessel, the apparatus comprising a suction line which extends from the closed vessel to the open vessel via drive means, such as a pump or compressor, and a solids feed line which extends from a solids outlet in the open vessel to a solids inlet in the closed vessel, a fluidising apparatus being provided to fluidise the solids in the open vessel.

28 Claims, 1 Drawing Sheet

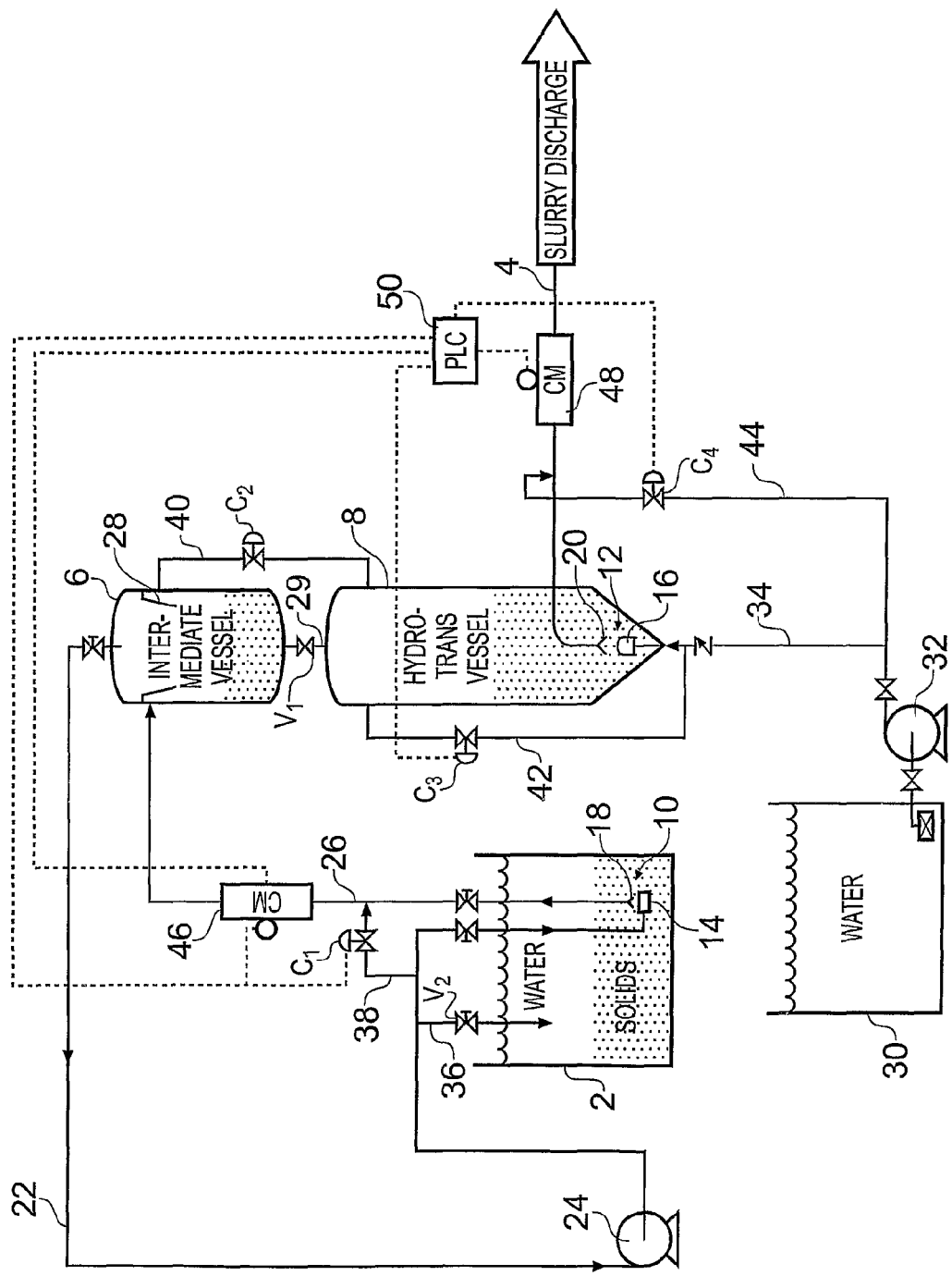

APPARATUS FOR TRANSFERRING SETTLED OR SUSPENDED SOLIDS FROM AN OPEN VESSEL INTO A CLOSED VESSEL

This invention relates to apparatus for transferring settled or suspended solids from an open vessel into a closed vessel. Particularly, although not exclusively, this invention relates to apparatus for transferring solids which have been fluidised in a fluidising unit from the open vessel into a closed vessel at a controlled rate.

BACKGROUND TO THE INVENTION

In deep sea drilling operations, huge quantities of drill cuttings can accumulate around a drilling rig. A growing awareness of the environmental impact of these drill cuttings has resulted in regulations requiring their removal and treatment. However these drill cuttings tend to agglomerate and are difficult to remove quickly and efficiently. The inventors have devised a method of fluidising settled solids, in order to cause the solids to form a slurry which can be removed from the sea bed for treatment, storage or transport. In order to improve the efficiency of the process, it has been proposed that once the drill cuttings have been fluidised, they are transported to shore or into a vessel in a continuous or batch process, so that the rate at which the drill cuttings can be removed is maximised.

In an alternative application, it may be desirable to drain a tank containing for example toxic and/or radio active waste with both liquid and solid constituents. For example it may be that the original storage tank has corroded, or the contents are to be removed for treatment. In this application, it is clearly important that the contents of the tank are contained at all times and that the volume of material which is transferred is minimised while still providing sufficient disturbance of the solids in the tank to ensure complete suspension of the solids and controlled emptying of the tank. Alternatively, it may be desirable to remove the solids/sludge from the bottom of the tank, without overly disturbing the fine solids, and in particular without adding to or subtracting from the volume of liquid in the tank, thus ensuring that the required liquid level in the tank is maintained. This has particular relevance when the liquid level above the solids acts as a radiation shield.

STATEMENT OF INVENTION

According to a first aspect of the present invention there is provided apparatus for transferring settled or suspended solids from an open vessel into a closed vessel, the apparatus comprising a suction line which extends from the closed vessel to the open vessel via a pump or compressor and a solids feed line which extends from the solids outlet in the open vessel to a solids inlet in the closed vessel, a fluidising apparatus being provided to fluidise the solids in the open vessel.

The term "open vessel" is intended to encompass any vessel open to the atmosphere or to any natural open structure which contains fluid, such as a lake bed or sea bed.

Preferably, the fluidising apparatus comprises a flow chamber having a fluid inlet and a fluid outlet, means for establishing a swirling or coanda flow in a fluid passing out of the fluid outlet, and a transport outlet for transporting fluidised material away from the flow chamber. The transport outlet may be situated externally or internally of the flow chamber, and is preferably situated on a central axis of the flow chamber. Most preferably, it is situated above the flow chamber.

Preferably, means is provided for controlling the rate at which solids are transferred from the open vessel into the closed vessel. Preferably, these means comprise a flow meter which measures the rate of flow of suspended solids in the suction line or feed line.

Preferably, the closed vessel comprises a feed vessel which feeds suspended solids into a transport vessel containing a fluidising unit. Preferably, the transport vessel comprises a solids outlet through which suspended solids are discharged at a controlled rate along a slurry discharge line. Preferably, means are provided on the slurry discharge line for measuring the flow rate of slurry discharge. Preferably, a bypass line is provided to allow fluid from the open vessel to bypass the fluidising unit and to pass directly into the slurry discharge line to control slurry concentration. Preferably, a valve is provided in the bypass line. Preferably, an ultrasonic unit is disposed in the slurry discharge line to deaglomerate the slurry.

Preferably, means are provided for controlling the flow rate and/or concentration of suspended solids from the open vessel into the closed vessel based on the flow rate and/or concentration of suspended solids from the transport vessel, so that the solids content of the transport vessel is maintained at a substantially constant level.

Preferably, the flow rate of suspended solids from the open vessel to the closed vessel and the rate of discharge of suspended solids from the transport vessel are controlled by means of valves. Most preferably, the valves are controlled by a computer, dependent on input from flow meters. Preferably, the flow meters are "density" meters or mass flow meters such as coriolis meters.

According to a second aspect of the present invention, there is provided a method of transferring settled or suspended solids from an open vessel into a closed vessel, the method comprising the steps of:
  (a) drawing fluid from the closed vessel into the open vessel;
  (b) operating a fluidising unit to fluidise the settled or suspended solids; and
  (c) drawing the fluidised solids from the open vessel into the closed vessel.

Preferably, the fluidising unit is driven by fluid drawn from the closed vessel.

Preferably, the fluid is drawn from the closed vessel into the open vessel by means of a pump or compressor.

Preferably, the fluid in the closed vessel is drawn initially from the open vessel and is recirculated between the closed vessel and the open vessel, so that no additional fluid is added to the system.

Preferably, the method further comprises the step of:
  (d) controlling the rate of discharge of the fluid and fluidised solids from the closed vessel into a discharge vessel, so that the concentration of solids discharged from the discharge vessel is maintained at a predetermined rate.

Thus, batchwise flow can be delivered to the closed vessel from the open vessel, whilst the slurry discharge from the discharge vessel is maintained at a constant concentration and/or flow rate.

Preferably, the step of controlling the rate of discharge is achieved by controlling a valve on an opening or pipe connecting the closed vessel to the discharge vessel.

Preferably, the method further comprises the step of fluidising the solids in the discharge vessel.

Preferably, no fluid other than the fluid in the open vessel is used to fluidise and transport the settled and suspended solids from the open vessel to the closed vessel.

Preferably, no fluid other than the fluid in the open vessel is used to transport the settled and suspended solids from the closed vessel to the discharge vessel.

The above method and apparatus can be adapted for many uses, and in particular may be used in any of the following processes:

1. A process which can operate below sea level to remove contaminated material from the seabed and hydro hoist the material to a receiving ship or barge for treatment or transportation to the shore.
2. A process for removing material from the seabed for the purpose of dredging, or the mining/retrieval of valuable elements.
3. A process for the removal of radioactive waste solids from storage ponds and tanks associated with any nuclear installations or power stations. The solids may be transported from the storage pond or tank to a cementing or sinter process for safe containment, either during operations or during decommissioning.
4. A process for removing solids from the bottom of a mineshaft, or back filling a mineshaft. Preferably, the bottom of the mineshaft comprises the open vessel, and the closed vessel and discharge vessel as situated at the surface adjacent the mine shaft. Preferably, a supply of liquid from the surface is used to feed the closed vessel and discharge vessel, so taking advantage of the hydrostatic head provided by supplying the liquid from the surface.
5. A process in which waste from mining operations is lifted to a transport vessel at the mine base for hydro transportation of the waste material to back fill a mine.

BRIEF DESCRIPTION OF THE DRAWINGS

For a better understanding of the present invention and to show how it may be carried into effect, reference will now be made, by way of example to the accompanying drawing which is a schematic representation of a continuous feed and discharge system for transporting suspended solids.

DETAILED DESCRIPTION OF A PREFERRED EMBODIMENT

Referring to the drawing, a tank of waste 2 containing both liquid and solid constituents is to be emptied into a slurry discharge pipeline 4 via an intermediate vessel and a hydro transport vessel 8. Fluidising units 10, 12 are provided in the tank 2 and hydro transport vessel 8. Each fluidising unit 10, 12 comprises a flow chamber 14, 16 which imparts a swirling flow to fluid which is forced into the flow chamber 14, 16 under pressure, and a discharge opening 18, 20 through which suspended solids, which have been fluidised by the fluidising units 10, 12, exit the tank 2 and hydro transport vessel 8, respectively as a controlled slurry.

A suction line 22 extends from an upper part of the intermediate vessel 6, via a pump 24 into the fluid inlet of the flow chamber 14 in the tank 2. A solids feed line 26 extends from the discharge opening 18 of the fluidising unit 10 into the intermediate vessel 6 beneath an annular baffle 28. A gravity feed line 29 fitted with a valve V1 connects the bottom of the intermediate vessel 6 to the top of the hydrotransport vessel 8.

The fluidising unit 12 in the hydrotransport vessel 8 is supplied with water under pressure from a water tank 30 via a pump 32 and water supply line 34. The water supply line 34 passes through a lower end of the hydro transport vessel 8 into the flow chamber 16 of the fluidising unit 12. The discharge opening 20 of the fluidising unit 12 is connected to the slurry discharge line 4.

A first bypass line 36 extends directly from the suction line 22 into the tank 2 and is controlled by a first bypass valve V2. A second bypass line 38 extends between suction line 22 and the solids feed line 26 and is controlled by a first computer controlled valve C1. A third bypass line 40 extends between the intermediate vessel 6 in the region of the annular baffle 28, to the upper region of the hydro transport vessel 8 and is controlled by a second computer controlled valve C2. A fourth bypass line 42 extends between the upper region of the hydro transport vessel 8 and the water supply line 34 and is controlled by a third computer controlled valve C3. Finally, a fifth bypass line 44 extends from the water supply line 34 to the slurry discharge line 4 and is controlled by a fourth computer controlled valve C4.

First and second coriolis mass flow meters 46, 48 are provided in the solids feed line 26 and slurry discharge line 4 respectively. The output from the coriolis flow meters 46, 48 is input to a computer 50 which uses control algorithms to control the degree of opening of the computer controlled valves C1 to C4.

The apparatus is designed to operate continuously, so that a continuous flow of fluidised solids is discharged at a predetermined rate down the slurry discharge line 4 after which it can be treated transported or stored as appropriate. The system operates as follows.

The intermediate vessel 6 may be vented to atmosphere prior to initiation of flow (so that the intermediate vessel 6 has a cyclic flow profile). Whether or not the intermediate vessel 6 is first vented, flow is initiated by starting the pump 24, so that fluid is drawn from the intermediate vessel 6 to the tank 2 through the suction line 22. With the valves V1 and C1 fully closed, the fluid under pressure passes into the flow chamber 14 of the fluidising unit 10 and is ejected as a swirling flow, which fluidises the surrounding solids in the tank 2.

Operation of the pump 24 creates a reduction in pressure in the intermediate vessel 6 which causes the fluidised solids to be drawn into the discharge opening 18 of the solids feed line 26 and to be ejected into the intermediate vessel 6 beneath the annular baffle 28. It will be appreciated that the annular baffle 28 deflects the solids downwardly towards the bottom of the intermediate vessel 6, so that fluid withdrawn from the top of the intermediate vessel 6 into the suction line 22 is substantially free of solids.

The valve V1 which connects the intermediate vessel 6 to the hydrotrans vessel 8 is opened to allow the solids in the intermediate vessel 6 to fall under gravity into the hydrotrans vessel 8. At the same time as the pump 24 is pumping fluid around the suction line 22, the pump 32 is operating to pump water from the water tank 30 into the flow chamber 16 of the fluidising unit 12. A swirling flow of fluid is discharged from the flow chamber 16 and fluidises the solids in the bottom of the hydro transport vessel 8. The entry of water under pressure into the hydro transport vessel 8 causes a positive pressure differential which forces the fluid and fluidised solids into the discharge opening 20 of the slurry discharge line 4, so that there is a constant feed of fluidised solids along the slurry discharge line 4.

The coriolis meter 48 measures the mass flow rate in the slurry discharge line 4 and inputs this data to the computer 50. At the same time, the coriolis flow meter 46 measures the mass flow rate in the solids feed line 26 and inputs this data to the computer 50. The computer 50 is programmed to adjust the opening of the computer controlled valves C1 to C4 so as to establish a stable relationship between the mass flow rate of the fluidised solids entering the intermediate vessel and the mass flow rate of the fluidised solids passing down the slurry discharge line 4. For example, if the mass flow rate measured by the coriolis meter 46 in the solids feed line 26 is insufficient to maintain the level of solids in the intermediate vessel 6 and hence the feed of solids to the hydro transport vessel 8, the computer 50 can operate to open the computer controlled valve C4, so that the fluidising unit 12 is less effective and the concentration of suspended solids in the flow along the slurry discharge line 4 is reduced. Alternatively, if the mass flow rate measured by the coriolis meter 46 in the solids feed line 26 is too great, such that the solids in the hydro transport vessel 8 transferred from the intermediate vessel 6 are building up faster than they are being removed down the slurry discharge line 4, the computer 50 can operate to increase the degree of opening of the computer control valve C1, so that the fluidising unit 10 is at least partially bypassed and the concentration of suspended solids in the flow in the solids feed line 26 is reduced.

In the illustrated embodiment, the suction line 22 extends from an upper part of the intermediate vessel 6. In an alternative embodiment, the suction line 22 extends from the base of the intermediate vessel 6, drawing through a lateral collection system which is positioned within a filter media bed (not shown) below the fluidising unit 12. This arrangement could be used in a batch system or single vessel system, rather than a continuous feed system, and would be particularly effective in capturing fine slow settling solids into the slurry. In a batch system, the hydrotransport vessel 8, discharge line 4 and associated mass flow meter could be dispensed with and the solids discharged from the intermediate vessel 6 in batches. The batch discharge of solids could be controlled by the computer 50 on the basis of input from the mass flow meter 46 alone. However, other control input, such as a measurement of level of settled solids in the intermediate vessel 6 could be used to trigger batch discharge.

The invention claimed is:

1. Apparatus for transferring settled and suspended solids from an open vessel into a closed vessel, where the closed vessel is not open to the atmosphere, the apparatus comprising a suction line which extends from the closed vessel to the open vessel via drive means and a solids feed line which extends from a solids outlet in the open vessel to a solids inlet in the closed vessel, a fluidising apparatus being provided to fluidise the solids in the open vessel, where the closed vessel comprises a feed vessel which feeds suspended solids into a transport vessel containing a fluidising unit, where the transport vessel comprises a solids outlet through which suspended solids are discharged at a controlled rate along a slurry discharge line, and a bypass line is provided to allow fluid from the closed vessel to bypass the fluidising unit and to pass directly into the slurry discharge line to control slurry concentration.

2. Apparatus as claimed in claim 1 where the fluidising apparatus comprises a flow chamber having a fluid inlet and a fluid outlet, the flow chamber being configured to establish a swirling or coanda flow in a fluid passing out of the fluid outlet, and where the apparatus further comprises a transport outlet for transporting fluidised material away from the flow chamber.

3. Apparatus as claimed in claim 2, in which the transport outlet is situated externally of the flow chamber.

4. Apparatus as claimed in claim 2, in which the transport outlet is situated directly above the flow chamber.

5. Apparatus as claimed in claim 2, in which the transport outlet is situated close to the flow chamber.

6. Apparatus as claimed in claim 1, further comprising a flow meter for controlling the rate at which solids are transferred from the open vessel into the closed vessel.

7. Apparatus as claimed in claim 6, in which the flow meter measures the rate of flow of suspended solids.

8. Apparatus as claimed in claim 1, in which means are provided on the slurry discharge line for measuring the flow rate of slurry discharge.

9. Apparatus as claimed in claim 1, in which a valve is provided in the bypass line.

10. Apparatus as claimed in claim 1, in which valves are provided for controlling the flow rate and/or concentration of suspended solids from the open vessel into the closed vessel based on the flow rate and/or concentration of suspended solids from the transport vessel, so that the solids content of the transport vessel is maintained at a substantially constant level.

11. Apparatus as claimed in claim 10, in which the flow rate of suspended solids from the open vessel to the closed vessel and the rate of discharge of suspended solids from the transport vessel are controlled by means of valves.

12. Apparatus as claimed in claim 11, in which the valves are controlled by a computer, dependent on input from flow meters.

13. Apparatus as claimed in claim 12, in which the flow meters are mass flow meters.

14. Apparatus as claimed in claim 13, in which the flow meters are coriolis or ultrasonic meters.

15. A method for transferring settled and suspended solids from an open vessel into a closed vessel, where the closed vessel is not open to the atmosphere, the method comprising:
 (a) drawing fluid from the closed vessel into the open vessel;
 (b) operating a fluidising unit with the said fluid to fluidise the settled and suspended solids; and
 (c) drawing the fluid and fluidised solids from the open vessel into the closed vessel,
 (d) where the closed vessel comprises a feed vessel and the method further comprises feeding suspended solids into a transport vessel containing a fluidising unit,
 (e) where the transport vessel further comprises a solids outlet, and the method further comprises discharging suspended solids at a controlled rate along a slurry discharge line, and
 (f) where a bypass line is provided to allow fluid from the closed vessel to bypass the fluidising unit, and the method further comprises passing fluid directly into the slurry discharge line thereby controlling slurry concentration.

16. A method as claimed in claim 15, in which the fluid is drawn from the closed vessel to the open vessel by means of a pump or compressor.

17. A method as claimed in claim 15 in which the fluid is recirculated between the closed vessel and the open vessel, so that no additional fluid is added to or removed from the system.

18. A method as claimed in claim 15 further comprising the step of:
 (d) controlling the rate of discharge of the fluid and fluidised solids from the closed vessel into a discharge vessel, so that a desired concentration of solids is discharged from the discharge vessel.

19. A method as claimed in claim 18 in which the concentration of solids discharged from the discharge vessel is maintained at a constant rate.

20. A method as claimed in claim 15, in which controlling the rate of discharge of solids from the closed vessel to the discharge vessel is achieved by controlling a valve on a pipe connecting the closed vessel to the discharge vessel.

21. A method as claimed in claim 18, further comprising the step of fluidising the solids in the discharge vessel.

22. A method as claimed in claim 15, in which no fluid other than the fluid in the open vessel is used to fluidise and transport the settled and suspended solids from the open vessel to the closed vessel.

23. A method as claimed in claim 15, in which the only fluid used to transport solids from the closed vessel to a discharge vessel is the said fluid.

24. A method as claimed in claim 15, which is adapted to operate below sea level to remove contaminated material from the seabed and to hydro hoist this material to a receiving ship or barge for treatment or transportation to the shore.

25. A method as claimed in claim 15 adapted to remove material from the seabed for the purposes of dredging or the mining/retrieval of valuable elements.

26. A method as claimed in claim 15 adapted for the removal of radioactive waste solids from storage ponds and tanks.

27. A method as claimed in claim 15 for use in conveying material deposited at the base of a mine shaft to a transport vessel and hydro transporting that material to the surface.

28. A method as claimed in claim 15 for use in conveying a material directly into the suction line of a slurry pump at concentrations and/or pressures matched to the pump's characteristics in order to maximize its efficiency.

* * * * *